Nov. 17, 1970          J. C. W. KRUISHOOP          3,541,399
    NON-POLAR ELECTROLYTIC CAPACITOR CONTAINING
              A SALT OF AN OXIDIZING ACID
                  Filed May 19, 1966
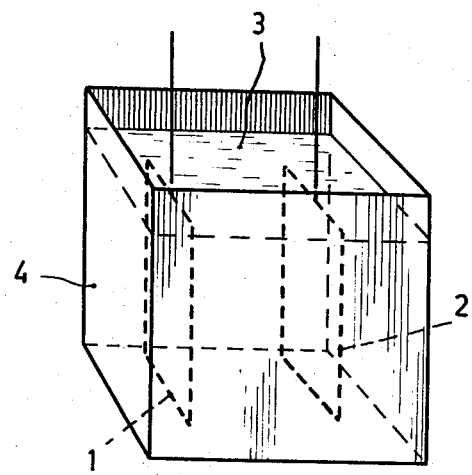
                                          INVENTOR.
                              JOHAN C. W. KRUISHOOP
                           BY
                                              AGENT

United States Patent Office 3,541,399
Patented Nov. 17, 1970

3,541,399
NON-POLAR ELECTROLYTIC CAPACITOR CONTAINING A SALT OF AN OXIDIZING ACID
Johan Christiaan Willem Kruishoop, Emmasingel, Eindhoven, Netherlands, assignor, by mesne assignments, to U.S. Philips Corporation, New York, N.Y., a corporation of Delaware
Filed May 19, 1966, Ser. No. 551,261
Claims priority, application Netherlands, May 27, 1965, 6506756; Jan. 25, 1966, 6600908
Int. Cl. H01g 9/00
U.S. Cl. 317—230      4 Claims

ABSTRACT OF THE DISCLOSURE

In a non-polar electrolytic capacitor the electrolyte contains an organic solvent incapable of liberating free hydrogen ions and an alkaline earth metal or earth metal salt of an inorganic oxidizing acid.

---

The invention relates to an electrolytic capacitor.

It is known that an electrolytic capacitor consists, in principle, of a metallic electrode provided with an oxide film, immersed in an electrolyte liquid together with a second electrode, usually consisting of an arbitrary, non-corrosive metal, the so-called counter-electrode. Said oxide film, which is usually obtained by anodic oxidation of the relevant electrode, operates as a dielectric in the capacitor and must therefore have satisfactory insulating properties. The liquid electrolyte serves not only for conducting the electric current but also permits of repairing small damage of the oxide film produced by local break-down in the operation of the capacitor (so-called "self-healing").

As compared with other types of capacitors the electrolytic capacitor has the advantage that a high capacitance is available per unit of volume.

An important disadvantage of the electrolytic capacitors, which till now was considered to be inevitable, is formed by the polar nature thereof. The capacitor has rectifying properties so that it can be employed as a capacitor only in the direction in which the dielectric film is positive with respect to the underlying metal (blocking direction).

It is possible, for example, to manufacture an electrolytic capacitor which has a leakage current of less than 1 $\mu$a./cm.$^2$ in the blocking direction at a forming voltage of, for example, 40 v.; however, in the forward direction, that is to say, when the said electrode is the cathode, such a capacitor has a leakage current of more than 1 ma./cm.$^2$ at the application of a voltage of only a few volts, which current increases in the course of time, since the oxide film is damaged more and more.

There are furthermore known so-called bi-polar electrolytic capacitors, the two metallic electrodes of which are both provided with such an anodic oxide film and arranged in a suitable liquid electrolyte. Such a capacitor may, it is true, be employed for the two polarities, since invariably one of the two electrodes is operative in the blocking direction, but in contrast thereto the capacitance per unit of volume is lower than that of a conventional unipolar electrolytic capacitor. This type of capacitor is found to be used in practice only rarely.

The invention provides an electrolytic capacitor which is non-polar and which has a leakage current in both directions of less than 1 $\mu$a./cm.$^2$ at an operational voltage of an absolute value of about 75% of the forming voltage.

The invented electrolytic capacitor, consisting of an electrode of a metal provided in known manner by anodic oxidation with a dielectric oxide film, an electrolyte solution and a counterelectrode of a metal also provided with such an anodic oxide film or any other metal, preferably a metal on which no dielectric oxide film is formed by anodic oxidation, or in other words, a metal which is chemically inert in this medium, is characterized in that the capacitor is non-polar and to this end contains an electrolyte-liquid, having a resistivity of less than 10,000 ohm/cm., and which consists of a solvent or a mixture of solvents which do not contain or split off hydrogen-ions, and in which is dissolved a salt comprising an oxidizing anion and a cation consisting of one of the alkaline earth metals or earth metals, in which liquid 2% of water at most is permissible.

The dielectric oxide film may also be produced by means of the mounting electrolyte liquid within the scope of the invention as a forming liquid, but this has been found to be not necessary. With the aid of any forming electrolyte the dielectric oxide film may be provided. It is practically very advantageous that in the industry the forming devices and the forming liquids hitherto employed can be used for this purpose.

The aforesaid alkali-earth metals are understood to include apart from calcium, strontium and barium, also magnesium. The earth metals are elements of the third main group of the Periodic System with the exception of the element boron; these are consequently: aluminum, scandium, yttrium and the lanthanides. In accordance with the invention it has been found that other metal ions are not suitable for use in the non-polar electrolytic capacitor according to the invention. For example alkali ions migrate, when the capacitor is switched opposite the forming voltage, across the dielectric oxide film and thus produce a high leakage current of the capacitor.

A particularly suitable type of electrolyte liquid for use in a nonpolar electrolytic capacitor in the scope of the invention consists of a mixture of pyridine and a different solvent which does not contain or split off hydrogen ions.

In one embodiment the liquid consists of at least 90% by weight of pyridine.

In a preferred embodiment the electrolyte consists of a salt or a salt mixture, the cations of which consist of calcium, whilst at least part of the anions or a further dissolved substance has oxidizing properties.

Preference has to be given to calcium nitrate which is preferably used in a high concentration, up to saturation.

The invention will be further explained with the aid of the following examples.

(I) The electrolyte liquids described, the solvents of which may belong to highly different classes of compounds, were all employed in an electrolytic capacitor which was manufactured as follows.

An aluminum foil of a purity of 99.99% was chemically etched for three minutes in a solution containing 5 g. of potassium bichromate per litre of a 50% solution of sulphuric acid in water at a temperature of 110° C. Anode plates were punched from the foil thus etched, said plates having a macroscopic surface on two sides of 3 cm.$^2$. The plates were formed to 10 v. and in some cases to 100 v. in an electrolyte solution containing in 1 litre of water, 7.5 g. of borax ($Na_2B_4O_7$, 10 $H_2O$) and 30 g. of boric acid. They were formed until the leakage current was less than 1 $\mu$a./cm.$^2$.

The formed electrode was then introduced into one of the following novel electrolyte liquids with a platinum counter-electrode and the capacitor thus obtained was conditioned by connecting it for 10 minutes to the forming voltage $V_F$ (10 or sometimes 100 v.), whilst the leakage current ($i_a$) was measured. Then the capacitor was connected in the opposite direction to 7.5 and 75 v. respectively and the leakage current ($i_k$) was again measured. The borax acid solution mentioned above may be replaced for the formation with the same final result by a conventional glycol-boric acid-ammonia electrolyte liquid.

A number of electrolyte liquids according to the invention are mentioned in the following table, in which are indicated the employed forming voltage $V_F$, the resultant leakage current in both directions, indicated by $i_a$ and $i_k$ and the resistivity of the liquid $\rho$.

The anhydrous salt was obtained by heating the relevant crystal-water containing salt, for example $$Mg(NO_3)_2 \cdot 6H_2O$$

$Ca(NO_3)_2 \cdot 6H_2O$ or $Sr(NO_3)_2 \cdot 4H_2O$ at 160° C. for some hours.

In the accompanying drawing an electrolytic capacitor according to the examples is shown, in which (1) designated the formed anode-foil of aluminum,
(2) a platinum foil of identical dimensions and
(3) one of the novel electrolytes. The whole assembly is placed within a housing 4.

TABLE

| Electrolyte liquid | $V_F$ (volt) | $i_a$ ($\mu A./cm.^2$) | $i_k$ ($\mu A./cm.^2$) | $\rho$ (ohm/cm. at 20° C.) |
|---|---|---|---|---|
| 1___ 6 g. Ca(NO$_3$)$_2$, 36 g. pyridine, 24 g. N,N-dimethylacetamide. | 10 | 0.1 | 0.25 | 460 |
| 2___ 2.8 g. Sr(NO$_3$)$_2$, 29 g. pyridine, 19 g. N,N-dimethylacetamide. | 10 | 0.1 | 0.25 | 3,350 |
| 3___ 1.8 g. Ba(NO$_3$)$_2$, 40 g. pyridine, 25 g. N,N-dimethylacetamide. | 10 | 0.1 | 0.30 | 1,080 |
| 4___ 4 g. Mg(NO$_3$)$_2$, 29 g. pyridine, 36 g. N,N-dimethylacetamide. | 10 | 0.06 | 0.04 | 200 |
| 5___ 5.3 g. Ca(NO$_3$)$_2$, 62 g. N,N-dimethylacetamide. | 10 | 0.28 | 0.23 | 180 |
| 6___ 6.15 g. Ca(NO$_3$)$_2$ 60 g. cyclohexanone. | 100 | 0.40 | 2.5 | 7,750 |
| 7___ 5.3 g. Ca(NO$_3$)$_2$, 78 g. dimethylsulphoxide. | 10 | 0.04 | 0.03 | 118 |
| 8___ 5.7 g. Ca(NO$_3$)$_2$, 37.1 g. cyano-acetic acid ethyl ester, 9.8 g. pyridine. | 10 | 0.50 | 0.30 | 4,760 |
| 9___ 8.2 g. Ca(NO$_3$)$_2$, 62.5 g. dimethylsulphoxide, 20.5 g. maleic acid anhydride. | 10 | 0.52 | 0.27 | 174 |
| 10__ 5.1 g. Ca(NO$_3$)$_2$, 11.4 g. α-picoline, 32.3 g. N,N-dimethylacetamide. | 10 | 0.01 | 0.08 | 400 |
| 11__ 5.5 g. Ca(NO$_3$)$_2$, 37.18 g. quinoline, 25.87 g. N,N-dimethylacetamide. | 10 / 100 | 0.03 / 0.02 | 0.02 / 0.5 | 745 |
| 12__ 7.4 g. Ca(NO$_3$)$_2$, 40.0 g. pyridine, 30.9 g. benzonitril. | 10 / 100 | 0.01 / 0.01 | 0.04 / 1 | 9,000 |
| 13__ 7.7 g. Ca(NO$_3$)$_2$, 39.5 g. pyridine, 31.3 g. nitroethane. | 10 | 0.01 | 0.10 | 710 |
| 14__ 6.4 g. Ca(NO$_3$)$_2$, 25.2 g. pyridine, 68.8 g. nitromethane. | 10 | 0.02 | 0.2 | 816 |
| 15__ 8.3 g. Ca(NO$_3$)$_2$, 37.6 g. cyclohexanone, 27.9 g. N,N-dimethylacetamide. | 10 / 100 | 0.01 / 0.2 | 0.1 / 1 | 830 |
| 16__ 5.0 g. Ca(NO$_3$)$_2$, 38.2 g. pyridine, 36.6 g. nitrobenzene. | 10 / 100 | 0.1 / 0.03 | 0.04 / 0.1 | 8,900 |
| 17__ 7.1 g. Ca(NO$_3$)$_2$, 31.7 g. pyridine, 37.7 g. di-methylsulphoxide. | 10 | 0.5 | 0.2 | 182 |
| 18__ 3.3 g. Y(NO$_3$)$_3$, 55.8 g. pyridine. | 10 | 0.3 | 0.6 | 1,750 |
| 19__ 6.6 g. Ca(NO$_3$)$_2$, 35.2 g. pyridine, 30.3 g. cyclohexanone. | 10 | 0.01 | 0.3 | 6,250 |
| 20__ 8.9 g. Y(NO$_3$)$_3$, 59.4 g. N,N-dimethylacetamide. | 10 | 0.02 | 0.1 | 640 |
| 21__ 7.9 g. Ca(NO$_3$)$_2$, 56.4 g. N,N-dimethylacetamide. | 10 | 0.02 | 0.02 | 456 |
| 22__ 7.2 g. Ca(NO$_3$)$_2$, 6.0 g. urea, 57.1 g. pyridine. | 10 | 0.02 | 0.02 | 1,230 |
| 23__ 4.0 g. Ca(NO$_3$)$_2$, 22.7 g. pyridine, 77.7 g. N,N-dimethylacetamide. | 10 | 0.02 | 0.3 | 238 |
| 24__ 5.9 g. Ca(NO$_3$)$_2$, 67.2 g. N-methylpyrrolidone. | 10 / 100 | 0.01 / 0.3 | 0.2 / 0.3 | 348 |
| 25__ 6 g. Ca(NO$_3$)$_2$, 45 g. methylethylketone. | 10 / 100 | 0.01 / 1.5 | 0.02 / 1.5 | 1,650 |
| 26__ 6 g. Ca(NO$_3$)$_2$, 45 g. furfural. | 10 | 0.02 | 0.2 | 2,220 |
| 27__ 16.8 g. Mg(NO$_3$)$_2$, 55.4 g. N,N-dimethyl-acetamide. | 100 | 0.06 | 0.1 | 292 |
| 28__ 5.4 g. Ca(NO$_3$)$_2$, 45.8 g. pyridine, 15.1 g. acetamide. | 10 | 0.13 | 0.15 | 585 |

(II)—Anode plates which were produced in the same way as in the preceding example were formed up to 40 v. in an electrolyte solution as in the preceding example, until the leakage current was less than 1 $\mu A./cm.^2$. The formed electrode was then introduced into a saturated solution of anhydrous Ca(NO$_3$)$_2$ in pure pyridine having a water content of less than 0.1% by weight with a platinum counter electrode. This electrolyte had a resistivity of 8000 ohms./cm.

The anhydrous calcium nitrate was obtained by heating the commercially available calcium nitrate $$Ca(NO_3)_2 \cdot 6H_2O$$

at 160° C. for a few hours. A small portion of the calcium nitrate is decomposed by pyrolysis into Ca(OH)$_2$, but this is unobjectionable, since Ca(OH)$_2$ is unsoluble in pyridine.

The capacitor was subsequently conditioned by connecting it to the forming voltage (40 v.) for 10 minutes. The leakage current was then found to be less than 0.3/$\mu a./cm.^2$. Then the resulting capacitor was connected to 30 v. in the opposite direction. After twelve hours the leakage current in said direction had dropped to less than 1/$\mu a./cm^2$.

It was found that after the capacitor had been connected in said direction for 400 hours the leakage current still dropped slowly.

If the formation described above was carried out in a conventional liquid glycol-boric acid-ammonia electrolyte, instead of in the aforesaid tetraborate-boric acid solution, the results were the same.

(III) In the manner described in Example 1 tantalum capacitors were manufactured and tested.

The punched Ta-plates were chemically etched in a fresh solution consisting of 10 mls. of concentrated HNO$_3$, 10 mls. of HF 40%, and 25 mls. of H$_2$SO$_4$ ($d$=1.84). The plates were formed in the conventional electrolyte on the basis of tetraborate-boric acid, glycol-boric acid, in 0.1 m. phosphoric acid or in diluted nitric acid. They were also formed up to 40 v. until the leakage current was less than 1/$\mu a./cm.^2$. They were then assembled in the manner described in Example 1 to form a capacitor: when conditioned on the forming voltage the leakage current was also less than 0.3/$\mu a./cm.^2$.

When connected to 30 v. in the reverse direction the leakage current dropped to less than 3/$\mu a./cm.^2$ in said direction and then remained stable.

(IV) Al-plates formed as described in Example I were assembled to form a capacitor, the mounting electrolyte being a saturated solution of anhydrous Ca(NO$_3$)$_2$ in a mixture consisting of 90% of anhydrous pyridine and 10% of anhydrous dimethylformamide, having a resistivity of 4000 ohms/cm. The resulting capacitor had a leakage current of less than 0.1/$\mu a./cm.^2$ in the direction of the forming voltage of 30 v. and a leakage current decreasing to below 3/$\mu a./cm.^2$ after twelve hours at the same voltage in the reverse direction.

What is claimed is:
1. A non-polar electrolytic capacitor comprising a first metal electrode provided with an anodic oxide film, an electrolytic solution having a water content of not greater than 2% by weight, a resistivity of less than 10,000 ohms/cm. and consisting essentially of an organic solvent incapable of liberating free hydrogen ions and at least one salt of nitric acid and a metal selected from the group consisting of calcium, strontium, magnesium, barium, aluminum, scandium, yttrium and the lanthanides and a second electrode formed of a metal chemically inert to said electrolytic solution or provided with an anodic oxide film.

2. The capacitor of claim 1 wherein calcium nitrate is employed.

3. The capacitor of claim 1 wherein the solvent partially consists of pyridine.

4. The capacitor of claim 3 wherein at least 90% by weight of the solvent is pyridine.

References Cited

UNITED STATES PATENTS

| | | | |
|---|---|---|---|
| 2,994,809 | 8/1961 | Jenny et al. | 317—230 |
| 2,884,381 | 4/1959 | Rodgers | 252—622 |
| 2,104,733 | 1/1938 | Brennan | 317—230 |
| 2,165,091 | 7/1939 | Clark | 317—230 |
| 2,932,153 | 4/1960 | Bernard et al. | 317—230 |
| 2,945,164 | 7/1960 | Taylor | 317—230 |
| 2,965,816 | 12/1960 | Ross | 317—230 |
| 3,065,389 | 11/1962 | Mahler et al. | 317—230 |
| 3,138,746 | 6/1964 | Burger et al. | 317—230 |
| 3,325,697 | 6/1967 | Ross | 317—230 |

JAMES D. KALLAM, Primary Examiner

U.S. Cl. X.R.

252—62.2